Nov. 7, 1950  F. E. KRUCKENBERG  2,528,760

ROLLER TRANSPORTING DEVICE FOR HEAVY OBJECTS

Filed July 24, 1946

FRED E. KRUCKENBERG
INVENTOR.

BY Edmund W. E. Kamm
ATTORNEY

Patented Nov. 7, 1950

2,528,760

UNITED STATES PATENT OFFICE 2,528,760

ROLLER TRANSPORTING DEVICE FOR HEAVY OBJECTS

Fred E. Kruckenberg, Fort Wayne, Ind.

Application July 24, 1946, Serial No. 685,953

7 Claims. (Cl. 280—3)

This invention relates to roller means for transporting heavy objects. More specifically, it relates to a set of rolls for supporting a heavy object, together with means for rotating one of said rolls for moving the object.

One of the objects is to provide a mechanism of the type described which is quickly attachable or detachable.

Another object of the invention is to provide a mechanism for transporting rigid objects which has manually operable means for propelling the object.

Still another object of the invention is to provide a set of rolls which are readily attachable to the object.

It is still another object of the invention to provide a mechanism which is adjustable for different sized objects.

Yet another object of the invention is to provide a chain driven roller mechanism.

These and other objects will be apparent from a study of this specification and the drawings which are attached hereto and made a part hereof, and in which.

Figure 1:
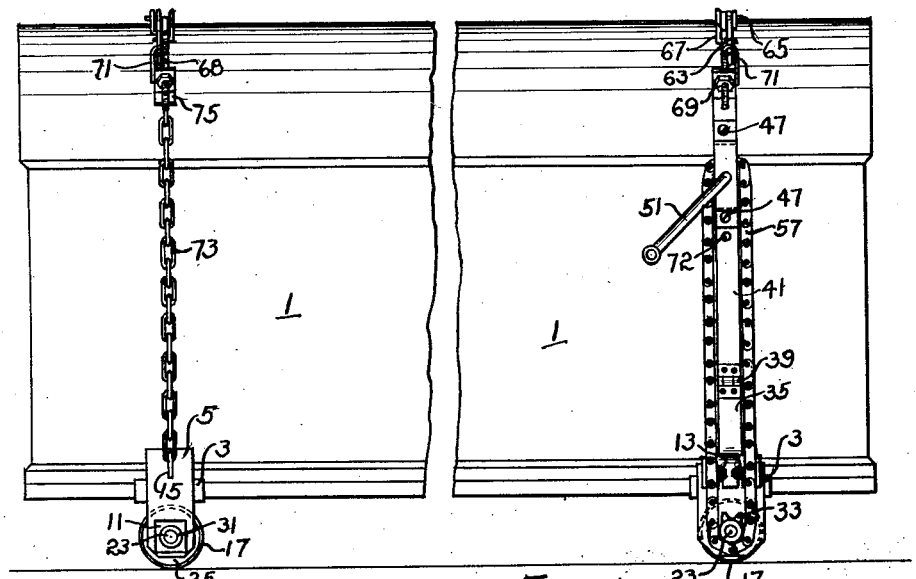
Figure 1 is a side elevation of the mechanism installed on the object.
Figure 2:
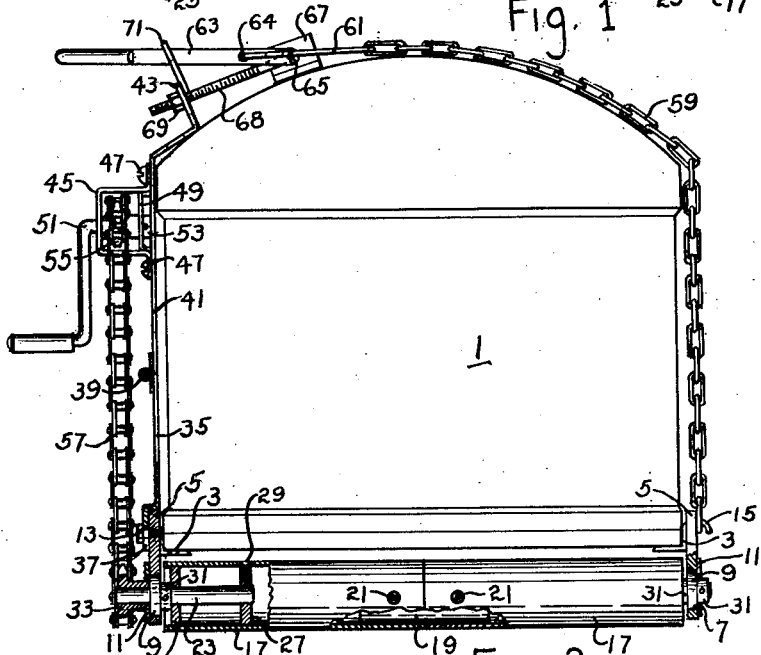
Figure 2 is a front elevation of the apparatus of Figure 1 with parts in section.

Referring now to Figures 1 and 2, the numeral 1 represents a concrete burial vault or similar object which is of rigid construction. A short piece of angle iron 3 is welded or otherwise attached to a vertical bearing support 5 which is perforated at 7 to receive a ball or roller bearing 9. A retainer plate 11 is preferably fixed to the exterior of the support to hold the bearing in place.

Four such units as described above are provided. However, the one at the corner where power is applied is modified slightly in that it is drilled and tapped to receive a pair of cap screws 13, while each of the other three is provided with a hook 15 adapted to receive the end of a chain.

The units are connected in pairs by the roller assemblies which comprise two tubes 17 connected at their center portions by a tube 19 which is held in telescopic relation by set screws 21.

A stub shaft 23 is welded into a disc 25 which is in turn welded or otherwise fixed in the end of the roller. A second disc 27 is welded or otherwise fixed to the inner end of the shaft and may either rest in the tube or may be held in place by set screws 29. Collars 31 may be fixed to the shaft on opposite sides of the bearings to hold the shaft in position with respect thereto. On the one unit, however, the driven sprocket 33 is substituted for the collar 31.

An upright member 35, having its lower end provided with two open ended slots 37 (Figs. 1 and 3), is mounted on the cap screws 13 and is fixed thereon by drawing up the screws. The upper end of the member is hinged at 39 to a second member 41 which extends upwardly, curves inwardly to fit the top of the object 1 and is provided with an upwardly extending ear 43.

A stirrup 45 is removably mounted by means of screws 47 to the upper end of member 41 and a bearing member 49 is welded or otherwise fixed to the stirrup. A crank shaft 51 is journalled in the stirrup and member 49, is held in place by a pinned collar 53 and has fixed thereto a driving sprocket 55. A chain 57 connects the sprockets.

A chain 59 is engaged with the hook 15, passes up over the object and is connected by a link 61 to a lever 63 at 64. The latter is pivotally mounted at 65 on a block 67. An eye bolt 68 is also pivoted at 65 on the block and extends through an opening in the ear 43. A nut 69 holds the parts in position. Since the pivot point 64 is above the point 65, rotation of the lever 63 in a counterclockwise direction will tighten the chain.

A hook 71 is fixed to the ear 43 and is adapted to engage the lever to hold it in adjusted position.

The roller which is not power driven is provided with a chain 59 and a tightening mechanism such as that just described; but instead of the hinged members 35, 41, it is provided with a chain 73 which is engaged at one end with hook 15 and is provided at the other end with an angle member 75, the upwardly extending end of which is perforated to receive the eye bolt and is provided with a hook 71. An additional set of holes 72 for the stirrup bolts 47 is provided in member 41.

Figures 3, 4:
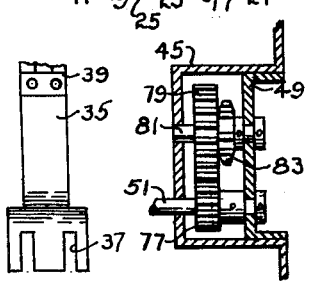
Figure 3 is an elevation showing the slotted side bar.
Figure 4 is a view of a modified drive mechanism.

In Figure 4 is shown a modified form in which the stirrup 45 is provided with a crank 51 which has fixed to it a gear 77 which meshes with gear 79 on the jack shaft 81 which also carries a sprocket 83. The latter drives the chain 57. The gearing 77 and 79 is preferably a 2 to 1 reduction.

Operation

The rollers are applied by loosening the set screws 21 and sliding the rolls 17 with respect to the tube 19 until the angles 3 fit the bottom of the object 1. Thereafter, the stirrup is adjusted to the proper set of holes 72.

The chains 59 and 73 of the nonpowered rolls are engaged with the hooks 15 and the nut 69 is adjusted with the lever 63 in the clockwise position. Thereafter, the lever is rotated counterclockwise and entered under the hook 71. If the chains are too loose or tight, further adjustment of the nut 69 is required.

The slots 37 are entered over screws 13 with the hinge 39 bent. Thereafter, the chain 57 is placed over sprocket 33, the hinge is straightened and the members 35, 41 are moved up or down until the upper portion of 41 rests on the top of the object 1 and the screws 13 are tightened. The chain 59 is engaged with hook 15, the nut 69 is adjusted and the lever 63 is rotated counterclockwise to tighten the chain 59.

The entire apparatus is then ready for moving by simply turning the crank 51.

Usually the powered roll is set near the center of the load so that the progress may be controlled by lifting the rear end of the object and swinging it sidewise.

In the event that it is desired to reduce the amount of effort required to turn the crank, reduction gears 77, 79 may be inserted between the crank 51 and the sprocket 83.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In an object handling device, a roll, a bearing support for each end of said roll, a bracket on each support for supporting the object, a vertical member fixed to said support, a stirrup mounted at the upper end of said member, said vertical member being hinged for movement between folded and straightened positions, a sprocket connected to drive the roll disposed on the side of the support opposite the roll, a sprocket in the stirrup and a chain adapted to drivingly engage both sprockets when the hinged member is in its straightened position.

2. In an object handling device, a roll, a bearing support for each end of said roll, a bracket on each support for supporting the object, a vertical member fixed to said support, a stirrup mounted at the upper end of said member, said vertical member being hinged for movement between folded and straightened positions, a sprocket connected to drive the roll disposed on the side of the support opposite the roll, a sprocket in the stirrup and a chain adapted to drivingly engage both sprockets when the hinged member is in its straightened position, said chain becoming slack between said sprockets when said member occupies its folded position so that the chain may be disengaged from the roll driving sprocket.

3. In an object handling device, a roll, a bearing support for each end of said roll, a bracket on each support for supporting the object, a vertical member fixed to said support, a stirrup mounted at the upper end of said member, means on said stirrup and roll for driving the roll and a flexible cable connecting the upper end of the member with the bracket at the opposite end of the roll.

4. In an object handling device, a roll, a bearing support for each end of said roll, a bracket on each support for supporting the object, a vertical member fixed to one support, a stirrup mounted at the upper end of said member, means on said stirrup and roll for driving the roll, a cable connecting the upper end of the member with the bracket at the opposite end of the roll and means for tightening the cable.

5. In an object handling device, a roll, a bearing support for each end of said roll, a bracket on each support for supporting the object, a vertical member fixed to said support, a stirrup mounted at the upper end of said member and means on said stirrup and roll for driving the roll, said vertical member being slotted and fitting over fasteners on the support to render said member adjustable for height and demountable.

6. In an object handling device, a roll, a bearing support for each end of said roll, a bracket on each support for supporting the object, a vertical member fixed to said support, a stirrup mounted at the upper end of said member and means on said stirrup and roll for driving the roll, said vertical member being slotted and fitting over fasteners on the support to render said member adjustable for height and demountable, said roll being constructed of telescopic sections to provide adjustment to accommodate the width of the object.

7. In an object handling device for a rigid object, a roll, a journal projecting from each end thereof, a bearing support for each journal, a bracket on each support for supporting the object, said roll being constructed of two end sections telescoped over a central section, and means for adjustably holding said sections in telescopic relation.

FRED E. KRUCKENBERG.

REFERENCES CITED

The following references are of record in the file of this patent:

UNITED STATES PATENTS

| Number | Name | Date |
| --- | --- | --- |
| 134,930 | Reamy | Jan. 14, 1873 |
| 890,713 | Ross | June 16, 1908 |
| 1,055,113 | Wittrock | Mar. 4, 1913 |
| 1,112,963 | Alexander | Oct. 6, 1914 |
| 1,176,876 | Vartabedian | Mar. 28, 1916 |
| 2,055,860 | Faries et al. | Sept. 29, 1936 |
| 2,116,825 | Crescent et al. | May 10, 1938 |

FOREIGN PATENTS

| Number | Country | Date |
| --- | --- | --- |
| 20,055 | Great Britain | Oct. 8, 1901 |
| 768,635 | France | May 22, 1934 |